US009235971B1

(12) United States Patent
Juels et al.

(10) Patent No.: US 9,235,971 B1
(45) Date of Patent: Jan. 12, 2016

(54) SERVICE WINDOW OPTIMIZED SYSTEM ALERT ENGINE

(75) Inventors: Ari Juels, Brookline, MA (US); Stephen Todd, Shrewsbury, MA (US); YinKee Yee, Newark, CA (US)

(73) Assignee: EMC Corporation, Hopkinton, MA (US)

( * ) Notice: Subject to any disclaimer, the term of this patent is extended or adjusted under 35 U.S.C. 154(b) by 1136 days.

(21) Appl. No.: 13/170,345

(22) Filed: Jun. 28, 2011

(51) Int. Cl.
- G08B 21/00 (2006.01)
- G06F 15/16 (2006.01)
- G06F 15/173 (2006.01)
- G06F 9/44 (2006.01)

(52) U.S. Cl.
CPC ..................... G08B 21/00 (2013.01)

(58) Field of Classification Search
CPC ...................................................... G08B 21/00
USPC .......... 340/506, 540; 709/206, 231, 224, 225, 709/248, 223, 100; 235/379; 700/83; 717/126; 726/23; 713/100; 707/999.12
See application file for complete search history.

(56) References Cited

U.S. PATENT DOCUMENTS

| | | | |
|---|---|---|---|
| 5,686,896 A | | 11/1997 | Bergman |
| 6,014,689 A | * | 1/2000 | Budge et al. ................... 709/206 |
| 6,115,743 A | * | 9/2000 | Cowan et al. .................. 709/224 |
| 6,920,554 B2 | * | 7/2005 | Rawson, III ................... 713/100 |
| 7,356,372 B1 | * | 4/2008 | Duncan et al. .................... 700/83 |
| 7,621,443 B2 | * | 11/2009 | Keohane et al. ............... 235/379 |
| 7,660,815 B1 | * | 2/2010 | Scofield et al. ........ 707/999.102 |
| 7,721,087 B1 | | 5/2010 | DiPasquo |
| 8,171,458 B2 | * | 5/2012 | Cheng et al. ................... 717/126 |
| 8,248,228 B2 | * | 8/2012 | Hollender ...................... 340/506 |
| 8,380,838 B2 | * | 2/2013 | Bose et al. ...................... 709/223 |
| 8,560,732 B2 | * | 10/2013 | Schneider ...................... 709/248 |

(Continued)

FOREIGN PATENT DOCUMENTS

| | | |
|---|---|---|
| GB | 2453602 A | 4/2009 |
| WO | 2005/067630 A2 | 7/2005 |
| WO | 2008/079210 A1 | 7/2008 |

OTHER PUBLICATIONS

U.S. Appl. No. 12/982,288 filed filed in the name of J.P. Field et al. on Dec. 30, 2010 and entitled "Distributed Security Information and Event Management System with Application-Injected Remote Components."

*Primary Examiner* — Jennifer Mehmood
*Assistant Examiner* — John Mortell
(74) *Attorney, Agent, or Firm* — Ryan, Mason & Lewis, LLP

(57) ABSTRACT

A service window optimized system alert engine is disclosed for automated generation and delivery of alerts relating to detected conditions of a monitored system. The service window optimized system alert engine comprises a state monitor, a system configuration and history module, an alert generator, and an alert router. The state monitor is configured to send status data of the monitored system to the alert generator. The system configuration and history module provides information to the alert generator specifying an alert generation policy established for the monitored system. The alert generator is configured to process the status data from the state monitor in accordance with the alert generation policy specified by the system configuration and history module to generate at least one alert. The alert router is configured to determine optimal delivery characteristics for the generated alert and to deliver the alert in accordance with the optimal delivery characteristics.

20 Claims, 3 Drawing Sheets

(56) References Cited

U.S. PATENT DOCUMENTS

| | | | |
|---|---|---|---|
| 8,578,285 B2* | 11/2013 | Wetzer et al. | 715/769 |
| 8,738,290 B2* | 5/2014 | Abraham et al. | 701/412 |
| 8,775,602 B2* | 7/2014 | Chu et al. | 709/224 |
| 8,848,608 B1* | 9/2014 | Addepalli et al. | 370/328 |
| 8,892,719 B2* | 11/2014 | Lockhart et al. | 709/224 |
| 8,954,514 B2* | 2/2015 | Gunasekara | 709/206 |
| 2002/0120697 A1* | 8/2002 | Generous et al. | 709/206 |
| 2003/0028577 A1* | 2/2003 | Dorland et al. | 709/100 |
| 2006/0111092 A1 | 5/2006 | Harris et al. | |
| 2006/0271677 A1* | 11/2006 | Mercier | 709/224 |
| 2007/0063837 A1* | 3/2007 | McKenna et al. | 340/540 |
| 2007/0283012 A1* | 12/2007 | Chu et al. | 709/225 |
| 2008/0070522 A1 | 3/2008 | Marriott et al. | |
| 2008/0301810 A1* | 12/2008 | Lehane et al. | 726/23 |
| 2010/0238037 A1 | 9/2010 | Bristow et al. | |
| 2011/0153754 A1* | 6/2011 | Gunasekara | 709/206 |
| 2011/0238855 A1* | 9/2011 | Korsunsky et al. | 709/231 |

* cited by examiner

SERVICE WINDOW OPTIMIZED SYSTEM ALERT ENGINE

FIELD OF THE INVENTION

The present invention relates generally to the field of information processing, and more particularly to generation and delivery of alerts relating to detected conditions in a monitored system.

BACKGROUND OF THE INVENTION

Many electronic systems may from time to time enter error, failure, or resource-depletion states where practical remediation requires human intervention or benefits from human oversight. Furnishing timely alerts to users, administrators, or service personnel in such cases can be essential to ongoing system functioning. The effectiveness of alerts depends not merely on their content, but also their time of delivery and channel of presentation. Alerts that occur at inconvenient times or are presented through unsuitable channels may go ignored during critical periods or present a nuisance to users.

Unfortunately, conventional alerting arrangements are deficient in a number of significant aspects. For example, these conventional arrangements generally fail to combine extensive knowledge of system state and events with a range of human and other factors in generating alerts. Conventional arrangements therefore fail to provide adequate context sensitivity when generating alerts, and as a result the alerts are less likely to be received and heeded by users in a timely way.

Moreover, there is no general alerting framework available in the prior art that can be applied to a wide variety of different types of monitoring systems, including storage systems and other types of information technology infrastructure. Such infrastructure is becoming increasingly complex, particularly as a growing number of companies and other enterprises are reducing their costs by migrating portions of their information technology infrastructure to cloud service providers. For example, virtual data centers and other types of systems comprising distributed virtual infrastructure are coming into widespread use. Commercially available virtualization software such as VMware® vSphere™ may be used to build a variety of different types of virtual infrastructure, including private and public cloud computing and storage systems, distributed across hundreds of interconnected physical computers and storage devices. In these and other types of modern information technology infrastructure, effective alerting is crucial to maintaining desired levels of system performance.

SUMMARY OF THE INVENTION

An illustrative embodiment of the invention provides an automating alerting framework referred to herein as a service window optimized system alert engine or SWOSA engine, which can provide highly accurate and efficient alerting for a wide variety of different monitored systems, including storage systems and other types of systems that are implemented using distributed virtual infrastructure.

In accordance with one aspect of the invention, a processing platform comprises at least one processing device having a processor coupled to a memory, with the processing platform implementing a plurality of modules of a service window optimized system alert engine for automated generation and delivery of alerts relating to detected conditions of a monitored system.

The modules of the service window optimized system alert engine may illustratively comprise a state monitor, a system configuration and history module, an alert generator, and an alert router. The state monitor is configured to send status data of the monitored system to the alert generator. The system configuration and history module provides information to the alert generator specifying an alert generation policy established for the monitored system. The alert generator is configured to process the status data from the state monitor in accordance with the alert generation policy specified by the system configuration and history module to generate at least one alert. The alert router is configured to determine optimal delivery characteristics for the generated alert and to deliver the alert in accordance with the optimal delivery characteristics.

Other aspects of the invention include an information processing system comprising a service window optimized system alert engine, a method for automated generation and delivery of alerts, and an associated computer program product.

The illustrative embodiments advantageously overcome one or more of the above-noted drawbacks of conventional alerting arrangements. For example, one or more of the disclosed embodiments combine extensive knowledge of system state and events with a range of human and other factors in generating alerts, thereby providing a high level of context sensitivity when generating alerts, ensuring that the alerts are more likely to be received and heeded by users in a timely way. Also, the service window optimized system alert engine provides a general alerting framework that can be applied to a wide variety of different types of monitored systems, including storage systems and other types of information technology infrastructure, regardless of their complexity. This considerably facilitates the provisioning of effective alerting, particularly in large-scale public or private clouds using distributed virtual infrastructure, thereby improving system performance.

These and other features and advantages of the present invention will become more readily apparent from the accompanying drawings and the following detailed description.

DETAILED DESCRIPTION

The present invention will be described herein with reference to exemplary information processing systems and associated servers, computers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
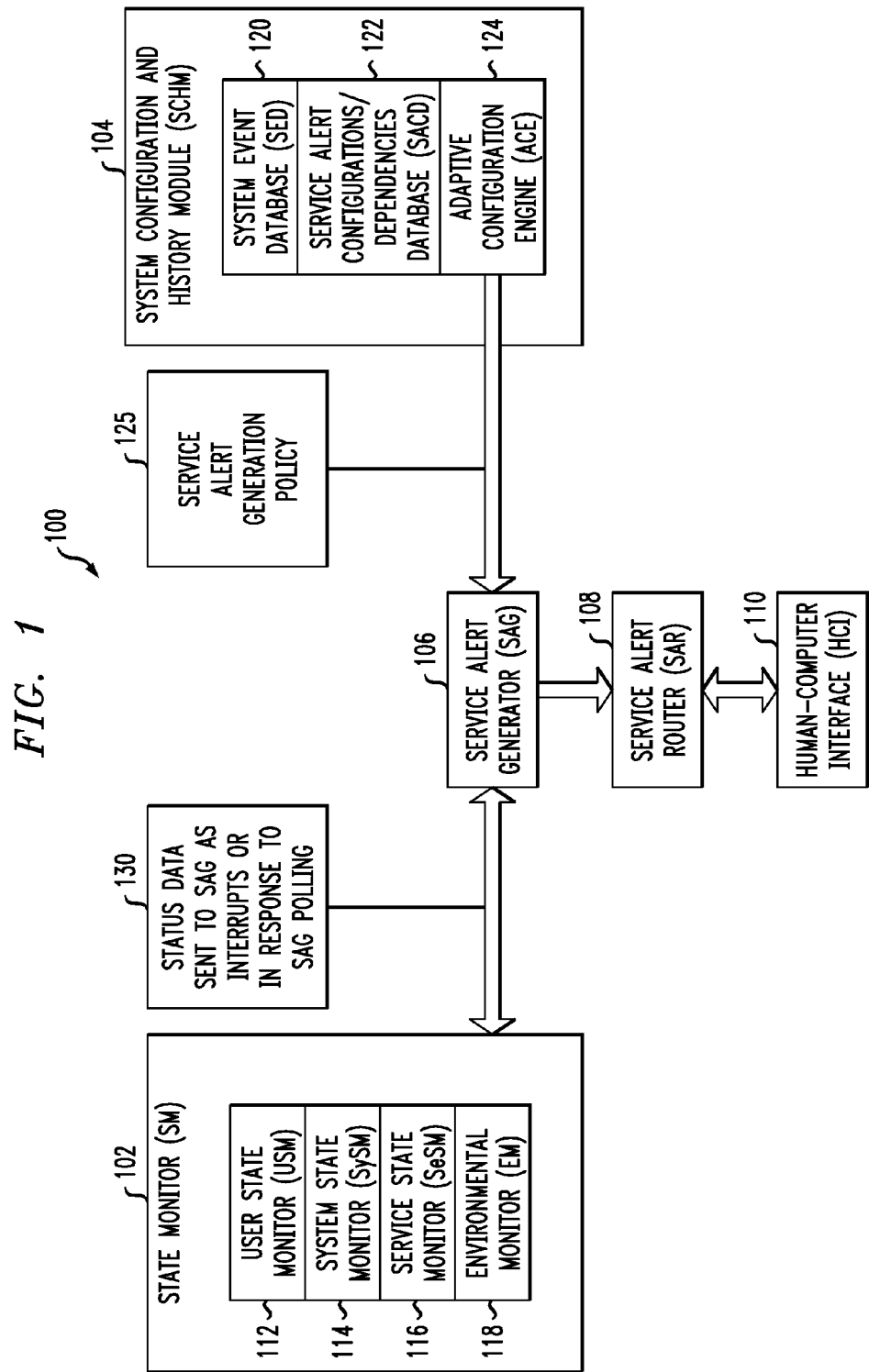
FIG. 1 shows an information processing system that incorporates automated alert generation and delivery functionality in an illustrative embodiment of the invention.

FIG. 1 shows an information processing system 100 configured with automated alert generation functionality in accordance with an illustrative embodiment of the invention. The information processing system 100 in this embodiment more particularly comprises a plurality of modules of a service window optimized system alert engine or SWOSA engine for automated generation of alerts relating to detected conditions of a monitored system. The monitored system, which is not explicitly shown in this figure, may be a storage system or any other type of system that may require the generation and delivery of alerts, and the invention is not limited in this regard. The monitored system may therefore be a component or other portion of the information processing system 100, or may be a separate system. The modules illustratively comprise a state monitor (SM) 102, a system configuration and history module (SCHM) 104, a service alert generator (SAG) 106, a service alert router (SAR) 108, and a human-computer interface (HCI) 110.

The service alerts referred to in the context of this illustrative embodiment are examples of what are more generally referred to herein as simply "alerts." Also, the service alert generator 106 and service alert router 108 are examples of what are more generally referred to herein as an "alert generator" and an "alert router," respectfully. Accordingly, it should be apparent that the disclosed techniques are not limited to generation and delivery of service alerts, but are more broadly applicable to other types of alerts as well.

The state monitor 102 is configured to send status data of the monitored system to the service alert generator 106. For example, the status data of the monitored system may comprise interrupts received in the service alert generator 108 from the state monitor 102. As another example, the status data of the monitored system may comprise information obtained by polling of the state monitor 102 by the service alert generator 106. These and other types of status data in any combination may be processed by the service alert generator 106 in generating alerts in the manner disclosed herein.

The state monitor 102 in the present embodiment collects, analyzes and outputs state information or other status data for consumption by the service alert generator 106, and comprises a number of distinct monitors, including a user state monitor (USM) 112, a system state monitor (SySM) 114, a service state monitor (SeSM) 116, and an environmental monitor (EM) 118. One or more of these monitors may each be at least partially incorporated into the monitored system, which as noted above may be separate from system 100.

The user state monitor 112 provides status data on administrators, service personnel and other users, such as physical location data as reported by GPS systems in user mobile devices, or virtual location data as listed on Facebook or other social networking web sites or as part of an instant messaging login status.

The system state monitor 114 provides status data on elements of current system operation, such as system load, active connections, etc.

The service state monitor 116 provides status data on service-related anomalies and other events, such as depleted resources, billing failure, etc.

The environmental monitor 118 provides status data from sensors implemented in or otherwise associated with the monitored system. Such status data may include, for example, data on ambient operational conditions, including temperature, vibration, power availability, time of day, lighting, etc.

The system configuration and history module 104 provides information to the service alert generator 106 specifying a service alert generation policy established for the monitored system. It stores system state information in system event database (SED) 120 and service alert configurations and dependencies database (SACD) 122. This information is processed by an adaptive configuration engine (ACE) 124 which determines the service alert generation policy for delivery to the service alert generator 106.

The service alert configurations and dependencies database 122 may be used to record user preference settings and system-component interdependencies such as root-cause analysis data.

It should be noted that portions of the system event database 120 and service alert configurations and dependencies database 122 may be external to a processing device that implements a remaining portion of the system configuration and history module 104. For example, an external portion of the system event database 120 may be used to store records of all data object accesses associated with the monitored system. Such records may be utilized by the SWOSA engine but can be implemented externally. The system event database 120 may also store records relating to SWOSA-specific events, such as information on drive failures and replacements in the context of a monitored storage system. More generally, different portions of any of the SWOSA engine components shown in FIG. 1 may be implemented on different processing devices of one or more processing platforms, such as the processing platform illustratively shown in FIG. 2.

The adaptive configuration engine 124 analyzes and models system and human behavioral history over time in determining the service alert generation policy to be provided to the service alert generator 106.

The system configuration and history module 104 is therefore configured to adapt the alert generation policy for the monitored system over time, using the adaptive configuration engine and the information stored in databases 120 and 122. For example, the alert generation policy may be periodically adapted based on information relating to alerts generated in accordance with that policy and corresponding responses to those alerts. More specifically, the alert generation policy may be adapted based on one or more of the delivery characteristics selected for delivery of a given alert, any acknowledgment received responsive to the given alert, and any resolution of the detected condition giving rise to the given alert.

At least a portion of the system event database 120 or other components of the system configuration and history module 104 may be part of or otherwise associated with a security information and event management (SIEM) system such as that described in U.S. patent application Ser. No. 12/982,288, filed Dec. 30, 2010 and entitled "Distributed Security Information and Event Management System with Application-Injected Remote Components," which is commonly assigned herewith and incorporated by reference herein. The techniques disclosed therein can be used to enhance the functionality of a centralized SIEM system such as the enVision® platform commercially available from RSA, The Security Division of EMC Corporation.

The service alert generator 106 is configured to process the status data from the state monitor 102 in accordance with the alert generation policy specified by the system configuration and history module 104 to generate at least one alert relating to the monitored system. The service alert generator 106 therefore accepts as input from the adaptive configuration engine 124 the service alert generation policy, and accepts interrupts from the state monitor 102 as status data and may additionally or alternatively poll elements of the state monitor 102 to obtain status data. The service alert generator 106 applies the service alert generation policy received from the adaptive configuration engine 124 to the current status data from the state monitor 102 in order to issue service alerts.

The service alert router 108 is configured to determine optimal delivery characteristics for each generated alert and to deliver the alert in accordance with the optimal delivery characteristics. The service alert router 108 therefore determines how and where service alerts should be presented to system users. For example, the optimal delivery characteristics may comprise an optimal interface type over which the alert is delivered to a user. The optimal interface type may be selected by the service alert router 108 from among a plurality of different interface types including one or more of an email interface, a short message service (SMS) interface, a telephony interface, an instant message interface and a computer graphical user interface.

The human-computer interface 110 in FIG. 1 may be viewed as denoting a particular one of the above-noted interface types or corresponding devices as selected by the service alert router 108 to receive a given service alert. The human-computer interface 110 may therefore comprise any computer, mobile device or other interface by which a user is informed of a service alert.

As indicated above, various elements of information processing system 100 may be implemented at least in part using public or private cloud infrastructure, or other distributed information technology infrastructure. Such a distributed information technology infrastructure may comprise, by way of example, a hypervisor platform and associated virtual processing and storage elements. An example of a commercially available hypervisor platform suitable for use in an embodiment of the invention is the VMware® vSphere™ which may include an associated management system such as vCenter™. The distributed infrastructure may further comprise one or more distributed processing platforms that include storage hardware products such as Celerra® and CLARiiON®, both commercially available from EMC Corporation of Hopkinton, Mass. A variety of other storage products, such as VNX and Symmetrix VMAX, both also from EMC Corporation, may be utilized to implement at least a portion of the information technology infrastructure.

Information technology infrastructure utilized to implement portions of the system 100 may comprise infrastructure used to provide one or more delivered services for an enterprise, including, but not limited to, Infrastructure as a Service (IAAS), Platform as a Service (PAAS), and Software as a Service (SAAS).

It is to be appreciated that the particular arrangement of elements shown in FIG. 1 is presented by way of illustrative example only, and in other embodiments different arrangements of additional or alternative elements may be used. Moreover, the functionalities associated with separate elements in the FIG. 1 embodiment may be combined into a lesser number of elements each of which performs multiple functions. Thus, at least a subset of the elements may be collectively implemented on a common processing platform, or each such element may be implemented on a separate processing platform comprising one or more servers, computers or other processing devices. For example, the service alert generator 106 and service alert router 108 may each run on a separate processing platform, or portions of such elements may run on the same platform.

Figure 2:
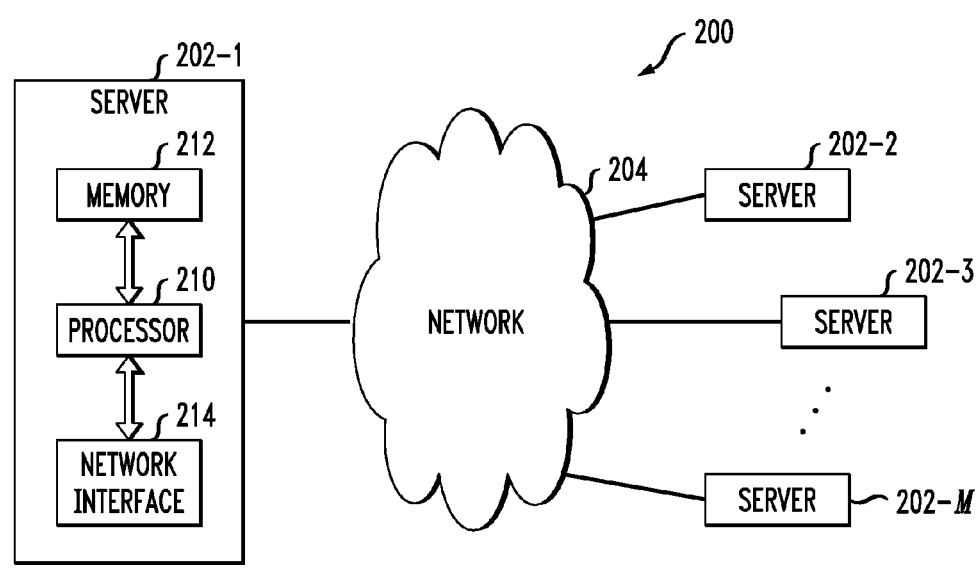
FIG. 2 is a block diagram of an exemplary processing platform that may be utilized to implement at least a portion of the FIG. 1 information processing system.

An example of a processing platform that may be used to implement at least a portion of the information processing system 100 is processing platform 200 shown in FIG. 2. The processing platform 200 in this embodiment comprises at least a portion of the system 100 and includes a plurality of servers, denoted 202-1, 202-2, 202-3, . . . 202-M, which communicate with one another over a network 204. One or more of the elements within the SWOSA engine of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of the information processing system 100. For example, two or more of the system configuration and history module 104, the service alert generator 106 and the service alert router 108 may each be implemented on a separate processing device of the processing platform. Again, multiple system elements may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of the SWOSA engine, or portions thereof. One skilled in the art would be readily able to implement such software given the teachings provided herein. Other examples of computer program products embodying aspects of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

It should be understood that a given embodiment of the system 100 may include multiple instances of the elements 102, 104, 106, 108 and 110, and other system elements, although only single instances of such elements are shown in the system diagram for clarity and simplicity of illustration. For example, alternative embodiments may comprise multiple state monitors, alert generators, or alert routers, in any combination.

Also, numerous other arrangements of computers, servers, storage devices or other components are possible in the information processing system 100. Such components can communicate with other elements of the information processing system 100 over any type of network, such as a wide area network (WAN), a local area network (LAN), a satellite network, a telephone or cable network, or various portions or combinations of these and other types of networks.

Figure 3:
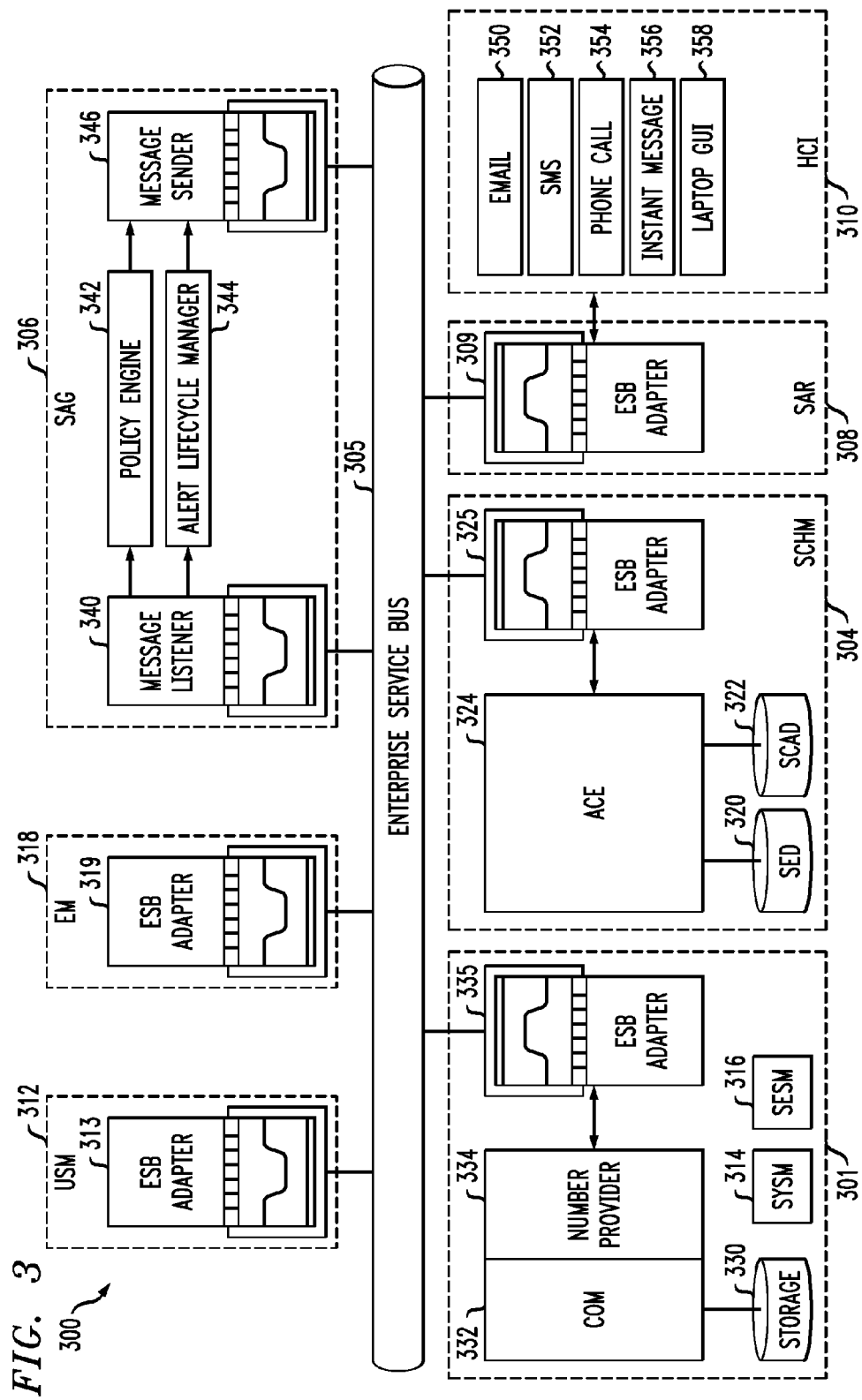
FIG. 3 shows a more detailed view of one possible implementation of an information processing system with automated alert generation and delivery functionality of the type illustrated in FIG. 1.

Referring now to FIG. 3, a more detailed view is shown of one possible implementation of an information processing system 300 with automated alert generation and delivery functionality of the type described above. The system 300 comprises a monitored system 301. The monitored system in this embodiment is illustratively shown as a storage system, and is coupled to an enterprise service bus (ESB) 305.

Also coupled to the enterprise service bus 305 are a system configuration and history module 304, a service alert generator 306, a service alert router 308, a human-computer interface 310, a user state monitor 312 and an environmental monitor 318. The monitored storage system 301 incorporates a system state monitor 314 and a service state monitor 316. The service alert router 308, user state monitor 312 and environmental monitor 318 comprise respective ESB adaptors 309, 313 and 319.

The system configuration and history module 304 comprises a system event database 320, a service alert configurations and dependencies database 322, an adaptive configuration engine 324, and an ESB adaptor 325.

The monitored system 301 comprises storage elements 330, coupled to a common object model (COM) services element 332 and a storage cluster logical unit number provider 334. The monitored system communicates with the other components of the system 300 via the enterprise service bus 305, which it accesses via an ESB adaptor 335.

The service alert generator 306 comprises a message listener element 340, a policy engine 342, an alert lifecycle manager 344, and a message sender 346. The policy engine 342 receives a service alert generation policy from the adaptive configuration engine 324 and applies that policy to the generation of one or more alerts relating to the monitored system 301. The alert lifecycle manager 344 interacts with service alert router 308 to determine when a particular alert has been delivered to a user. It may receive any acknowledgement or other response to the alert, and may also determine the conditions under which a repeat alert should be generated for a given detected condition in the event no response is received to the initial alert generated for that condition and the condition is not otherwise resolved.

The human-computer interface 310 in the present embodiment comprises a plurality of different interfaces over which alerts may be delivered, including an email interface 350, an SMS interface 352, a telephony interface 354, an instant message interface 356 and a laptop computer graphical user interface 358.

The components 304, 306, 308, 310, 312, 314, 316, 318, 320, 322 and 324 of the FIG. 3 embodiment generally operate in a similar manner to corresponding components 204, 206, 208, 210, 212, 214, 216, 218, 220, 222 and 224 of the FIG. 2 embodiment. Certain of these components in the FIG. 3 embodiment communicate with one another over the ESB 305 using associated ESB adaptors or other similar elements, such as message listener 340 and message sender 346.

At least a portion of the communications between the system components over the ESB 305 may be implemented using message-oriented middleware (MOM) for enterprise message processing. MOM is a category of software for communication in a loosely-coupled, reliable, scalable and secure manner amongst distributed applications and systems. It acts as a message mediator between message senders and message receivers, and provides an asynchronous, reliable message processing mechanism which we have determined is particularly well-suited for use in the present SWOSA embodiment.

Other communication techniques may also or alternatively be used, such as application programming interface (API) calls. For example, Java message service (JMS) may be used in the present embodiment to provide a standardized API to send and receive messages using the Java programming language in a vendor-neutral manner. The JMS API may be used to abstract the interaction between messaging clients and the above-noted MOM, and thereby link multiple JMS provider components of the system 300.

Operations code of the storage system 301 in a given implementation may be written in the C++ programming language. In this case, the number provider 334 may be built using a JMS C++ client library so that it can send messages to and receive messages from and receive message to JMS providers.

The COM services element 332 of monitored storage system 301 comprises a set of object management services which complies with the common information model (CIM) standard. This element utilizes CIM to structure information passed between storage system applications that are not otherwise designed for enterprise message processing. For example, this element may provide a standard CIM API for distributed applications through use of a limited protocol such as CIM-XML over HTTP.

It should be again noted that this particular set of modules for implementing the alert generation and delivery functionality of the SWOSA engine is presented by way of example, and in other embodiments additional or alternative modules may be used. Also, the functionality associated with separate modules in the FIG. 3 embodiment may be combined into a smaller set of functional modules in other embodiments.

It is a significant advantage of the SWOSA engine that it can be adapted in a straightforward manner for use with a wide variety of different monitored systems and associated detectable conditions.

As one particular example, assume that in the monitored storage system 301 of the FIG. 3 embodiment it is desirable to inform administrators of drive failures and to do so through the most effective channel of contact, e.g., computer GUI, IM, email, etc. In this example, a disk failure is the detected condition that leads to a SWOSA-generated alert.

At some time prior to the occurrence of the condition, the names of each storage administrator and the contact methods for that administrator (e.g., GUI, IM, email, etc.) are statically entered into the system, along with preferences about which administrator is primary, which contact method is preferred, the best time frame for delivering the alert, etc. This information is stored in the system configuration and history module 304.

The storage system 301 then detects a disk failure and propagates notice through the service state monitor 316 to the service alert generator 306. The adaptive configuration engine 324 pulls the static contact information from the system configuration and history module 304 and also the history of event resolutions in the monitored system 301. Based on both contact information and history, the adaptive configuration engine 324 formulates a service alert generation policy which may illustratively comprise an action list for generating the alert, and passes this action list to the service alert generator 306.

The service alert generator 306 takes the action list and for each action polls the user state monitor 312 to determine whether or not the administrator is available, subject to any rules for the timing of alert generation. If the administrator is not available, the service alert generator 306 records the history of this action by marking it as "not available" and moves on to the next contact approach. The service alert generator 306 then attempts to contact the administrator via the service alert router 308. Failed contact attempts (e.g. rejected emails) are marked, as are successful contact attempts. Once an alert has successfully been raised, if it is not cleared within a certain window of time, a timeout occurs and the action is marked. The service alert generator then moves on to the next contact option.

After the alert processing is completed, either successfully or unsuccessfully, the SWOSA history portion of the system event database 320 is updated with the history of actions for this alert.

For subsequent alerts the SWOSA history portion of the system event database 320 can be analyzed by the adaptive configuration engine 324. The adaptive configuration engine 324 can arrive at conclusions such as "email is an ineffective way of surfacing alerts to this user" and adjust the action list that is provided as a service alert generation policy to the service alert generator 306.

Thus, in the present example, the SWOSA engine stores alert details such as when an alert is generated, when an alert is sent through certain channel, when an alert is acknowledged by user, when an alert is ignored by user, and when an alert is resolved by user. It uses such details to modify its policies for presentation of subsequent alerts. An exemplary policy may specify a simple division between multiple presentation channels (e.g., pop-up on computer GUI, SMS and IM) based on date on time (e.g., when the date is workday and time is work time, use pop-up as primary content channel; when time is after work, use SMS as primary content channel; when date is weekend, use IM as primary contact channel).

The SWOSA engine in the illustrative embodiments can be configured to provide a high degree of sophistication in alert generation and delivery through adaptive and customized presentation policies. For example, the SWOSA engine can learn the console access or service action response behaviors of users, as well as their alert preferences. These embodiments accommodate user setting of preferences and automated, dynamic adjustment of SWOSA configuration.

A SWOSA engine configured as described above refines the presentation of alerts by combining knowledge of system state and events with a range of human factors. In illustrative embodiments, it generates and delivers alerts as a function not just of resource levels or event occurrence, but also factors such as time of day, servicing efficiency (e.g., the desirability of batching service requests), critical path position (e.g., the systemic importance of a particular failure condition), pattern of use, current load, user proximity, failure to elicit service response (e.g., if no user has logged into an error console over an extended period of time, alerts might be escalated to an alternative interface), sensor data, and availability of administrators, service personnel and other users.

Alerts generated by the SWOSA engine may include alerts relating to resource depletion in a monitored system. Examples of errors and other failure alerts requiring human intervention include broken hardware components, such as fans in storage devices, jammed paper in printers, broken sensors or actuators, space shortages or latent sector error development on storage devices, depleted battery power on computing and sensing devices, and low ink or paper stocks on printers.

As another example of an application of a SWOSA engine to a monitored system, consider an arrangement in which the monitored system comprises a smoke detector. Most smoke detectors today are either powered by batteries or contain batteries as a source of backup power. They typically emit a warning sound (a "chirp") when a battery is on the verge of depletion and requires replacement. Unfortunate timing can render such alerts a nuisance (e.g., sounding at 3 a.m. in a home).

A SWOSA engine of the type shown in FIG. 1 can be applied to a smoke detector low battery condition through the use of a clock and possibly one or more sensors. Under the control of the SWOSA engine, the detector might then schedule low-power alerts such that they both offer an acceptable margin of time for replacement (e.g., 24 hours) and also take place at a convenient time of day (e.g., between 6 a.m. and 10 p.m.). Additionally or alternatively, the detector might include a light sensor. If the sensor appears to reflect human activity in the vicinity of the detector, e.g., goes on and off in response to artificial or natural lighting, the detector might attempt to schedule its alerts during periods when light is detected.

More particularly, the elements of the SWOSA in this example might be configured in the following manner. The user state monitor 112 may comprise a Bluetooth device paired with the mobile phones of residents, in order to detect whether mobile phones are within detectable range:

Output: P∈(residents present/residents not present)

The service state monitor 116 senses battery depletion level in the smoke detector:

Output: B∈[0-100%] battery charge

The environmental monitor 118 determines the time of day from a built-in clock:

Output: T=Current time of day

It will be assumed for this particular simplified embodiment that the SWOSA engine does not include the system configuration and history module 104. Instead, the service alert generator 106 simply takes as input the triple (P, B, T). If (P=residents present) and (B<10%) and (06:00≤T≤22:00), then the service alert generator 106 issues a "chirp" order to the service alert router 108, which instructs the human-computer interface 110, in this case a speaker, to issue periodic chirps. When the battery is replaced, the output of the service state monitor 116 will indicate that battery charge B=100%. This new battery charge value will cause the chirping to stop via action of the service alert generator 106 and service alert router 108.

A similar SWOSA configuration may be used to control the generation and delivery of alerts for a wide variety of other types of devices, including computers, mobile telephones, and other communication devices. Such devices are intended to fall within the broad definition of "monitored system" as used herein.

The above-described illustrative embodiments advantageously provide a highly efficient and automated approach to generation and delivery of alerts relating to a monitored system.

The particular processing operations and other system functionality described in conjunction with the diagrams of FIGS. 1 through 3 are presented by way of illustrative example only, and should not be construed as limiting the scope of the invention in any way. Alternative embodiments can use other types of processing elements and operations for implementation of automated alert generation and delivery.

As indicated previously, functionality such as that described in conjunction with the diagrams of FIGS. 1 through 3 can be implemented at least in part in the form of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and information technology infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one processing platform comprising at least one processing device having a processor coupled to a memory, wherein the processing platform implements a plurality of modules of a service window optimized system alert engine for automated generation and delivery of alerts relating to detected conditions of a monitored system, the modules comprising:
a state monitor;
a system configuration and history module;
an alert generator; and
an alert router;
wherein the state monitor is configured to send status data of the monitored system to the alert generator;
wherein the system configuration and history module provides information to the alert generator specifying an alert generation policy established for the monitored system;
wherein the alert generator is configured to process the status data from the state monitor in accordance with the alert generation policy specified by the system configuration and history module to generate at least one alert;
wherein the alert router is configured:
to determine optimal delivery characteristics associated with at least one user for the generated alert based at least in part on the alert generation policy and a history of alert actions provided by the system configuration and history module; and
to deliver the alert to the at least one user in accordance with the optimal delivery characteristics;
wherein the system configuration and history module comprises:
a system event database;
an alert configurations and dependencies database; and
an adaptive configuration engine; and
wherein the adaptive configuration engine supplies the information specifying the alert generation policy to the alert generator.

2. The apparatus of claim 1 wherein the state monitor comprises at least one of:
a user state monitor;
a system state monitor;
a service state monitor; and
an environmental monitor.

3. The apparatus of claim 1 wherein the state monitor is implemented at least in part within the monitored system.

4. The apparatus of claim 1 wherein the status data of the monitored system comprises interrupts received in the alert generator from the state monitor.

5. The apparatus of claim 1 wherein the status data of the monitored system comprises information obtained by polling of the state monitor by the alert generator.

6. The apparatus of claim 1 wherein the monitored system comprises a storage system.

7. The apparatus of claim 1 wherein two or more of the system configuration and history module, the alert generator and the alert router are each implemented on a separate processing device of the processing platform.

8. The apparatus of claim 1 wherein the modules are configured to communicate with one another over an enterprise service bus.

9. The apparatus of claim 1 wherein the optimal delivery characteristics comprise an optimal interface type over which the alert is delivered to the at least one user, the optimal interface type being selected by the alert router from among a plurality of different interface types.

10. The apparatus of claim 9 wherein the plurality of different interface types include two or more of an email interface, an SMS interface, a telephony interface, an instant message interface and a computer graphical user interface.

11. The apparatus of claim 1 wherein the system configuration and history module is configured to adapt the alert generation policy over time based on information relating to alerts generated in accordance with that policy and corresponding responses to said alerts.

12. An apparatus comprising:
at least one processing platform comprising at least one processing device having a processor coupled to a memory, wherein the processing platform implements a plurality of modules of a service window optimized system alert engine for automated generation and delivery of alerts relating to detected conditions of a monitored system, the modules comprising:
a state monitor;
a system configuration and history module;
an alert generator; and
an alert router;
wherein the state monitor is configured to send status data of the monitored system to the alert generator;
wherein the system configuration and history module provides information to the alert generator specifying an alert generation policy established for the monitored system;
wherein the alert generator is configured to process the status data from the state monitor in accordance with the alert generation policy specified by the system configuration and history module to generate at least one alert;
wherein the alert router is configured:
to determine optimal delivery characteristics associated with at least one user for the generated alert based at least in part on the alert generation policy and a history of alert actions provided by the system configuration and history module; and
to deliver the alert to the at least one user in accordance with the optimal delivery characteristics;
wherein the system configuration and history module is configured to adapt the alert generation policy over time based on information relating to alerts generated in accordance with that policy and corresponding responses to said alerts; and
wherein the alert generation policy is adapted based on one or more of the delivery characteristics selected for delivery of a given alert, any acknowledgment received responsive to the given alert, and any resolution of the detected condition giving rise to the given alert.

13. A method comprising the steps of:
receiving status data relating to a monitored system at an alert generator of a service window optimized system alert engine from a state monitor of the service window optimized system alert engine;

receiving information specifying an alert generation policy established for the monitored system at the alert generator from a system configuration and history module of the service window optimized system alert engine;

processing the status data in accordance with the alert generation policy to generate at least one alert in the alert generator;

determining optimal delivery characteristics associated with at least one user for the generated alert based at least in part on the alert generation policy and a history of alert actions in an alert router of the service window optimized system alert engine; and delivering the alert to the at least one user in accordance with the optimal delivery characteristics utilizing the alert router;

wherein the system configuration and history module comprises:
  a system event database;
  an alert configurations and dependencies database; and
  an adaptive configuration engine; and wherein the adaptive configuration engine supplies the information specifying the alert generation policy to the alert generator.

14. The method of claim 13 wherein the step of determining optimal delivery characteristics comprises determining an optimal interface type over which the alert is delivered to the at least one user, the optimal interface type being selected from among a plurality of different interface types.

15. The method of claim 14 further comprising the step of adapting the alert generation policy over time based on information relating to alerts generated in accordance with that policy and corresponding responses to said alerts.

16. A computer program product comprising a non-transitory processor-readable storage medium having encoded therein executable code of one or more software programs, wherein the one or more software programs when executed by a processing device cause the processing device to implement the steps of the method of claim 13.

17. An information processing system comprising:
  information technology infrastructure comprising at least one monitored system; and
  a service window optimized system alert engine configured:
    to receive status data relating to the monitored system at an alert generator of the service window optimized system alert engine from a state monitor of the service window optimized system alert engine;
    to receive information specifying an alert generation policy established for the monitored system at the alert generator from a system configuration and history module of the service window optimized system alert engine;
    to process the status data in accordance with the alert generation policy to generate at least one alert in the alert generator;
    to determine optimal delivery characteristics associated with at least one user for the generated alert based at least in part on the alert generation policy and a history of alert actions in an alert router of the service window optimized system alert engine; and
    to deliver the alert to the at least one user in accordance with the optimal delivery characteristics utilizing the alert router;
  wherein the system configuration and history module comprises:
    a system event database;
    an alert configurations and dependencies database; and
    an adaptive configuration engine; and
  wherein the adaptive configuration engine supplies the information specifying the alert generation policy to the alert generator.

18. The information processing system of claim 17 wherein the information technology infrastructure comprises at least one processing platform comprising a plurality of processing devices with each such processing device of the processing platform comprising a processor coupled to a memory.

19. The apparatus of claim 12 wherein the system configuration and history module comprises:
  a system event database;
  an alert configurations and dependencies database; and
  an adaptive configuration engine.

20. The apparatus of claim 19 wherein the adaptive configuration engine supplies the information specifying the alert generation policy to the alert generator.

* * * * *